Nov. 24, 1931.  A. McD. McAFEE  1,833,430
MANUFACTURE OF ALUMINUM CHLORIDE
Filed Sept. 30, 1927
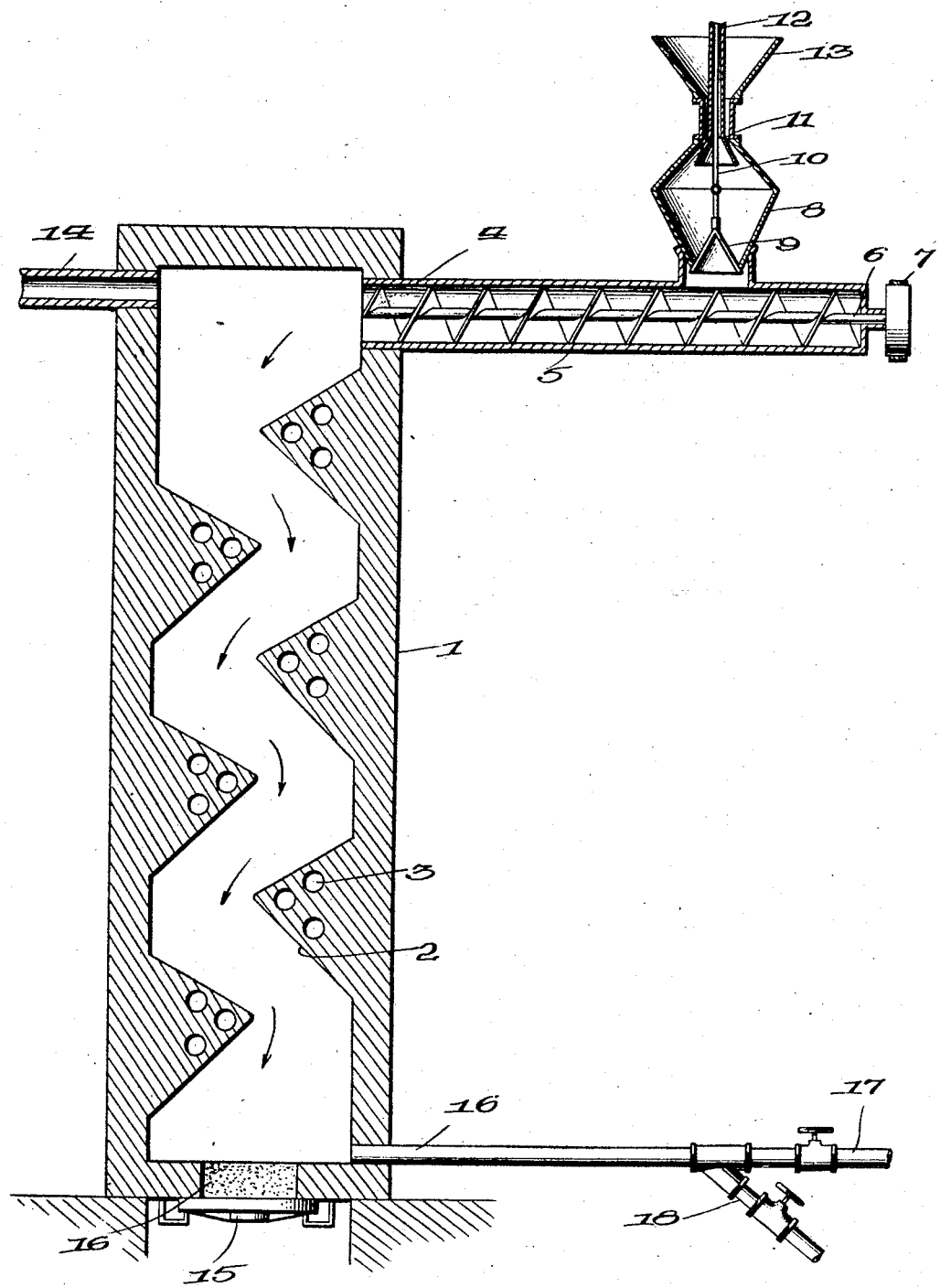
Inventor
A. M. McAFEE,
By K. P. McElroy
Attorney Patented Nov. 24, 1931

1,833,430

UNITED STATES PATENT OFFICE

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS

MANUFACTURE OF ALUMINUM CHLORIDE

Application filed September 30, 1927. Serial No. 222,065.

This invention relates to the manufacture of aluminum chlorid; and it comprises a method of producing anhydrous aluminum chlorid from bauxite and similar forms of alumina in admixture with carbon wherein such a mixture in a heated condition is tumbled down through an atmosphere of chlorin containing some oxygen and a minor proportion of nitrogen, such atmosphere passing slowly in countercurrent and conditions being arranged so that the bauxite and chlorin completely disappear in falling; all as more fully hereinafter set forth and as claimed.

All the ordinary methods of producing anhydrous aluminum chlorid are based on the conjoint action of carbon and chlorin on bauxite at a high temperature; usually above 1600° F. The reaction has long been known and many processes embodying it have been proposed and, to some extent, used. In all processes however there is the fundamental difficulty of supplying heat to the reaction zone in amounts sufficient to keep the reaction going at high velocity and with complete utilization of the chlorin and of the alumina. The earlier propositions were to use a retort of some type and convey the heat through the walls. These proved impractical for use on any large scale; and in modern practice reaction is generally on a charge of bauxite and coke contained in some type of shaft chamber, the heat necessary for reaction being furnished as preheat of the materials employed.

Operating on descending charges in shaft chambers is however attended with some practical difficulties since the linings are at a high temperature and at temperatures above 1400° or 1500° F. firebrick and other ceramic materials are attacked by the conjoint action of chlorin and carbon. Linings are therefore shortlived. In the present invention, this difficulty is met by developing the necessary heat in a falling charge of granular material; the fall being sufficiently retarded to ensure the charge completely reacting and disappearing in the time of fall. In so operating it is practicable to cool the shaft and its linings sufficiently to enhance materially the useful life of a firebrick lining. In the present invention I treat the bauxite and coke mixture as an open textured tumbling charge with the amount of chlorin necessary for reaction in admixture with oxygen somewhat diluted with nitrogen; the dilution however being not more than corresponds to equal volumes of nitrogen and oxygen.

The oxygen used burns a portion of the carbon to $CO$ and $CO_2$ and thereby supplies heat. Conditions are best so arranged as to give about equal proportions of $CO$ and $CO_2$ in the effluent mixture of gases and vapors. Generally, I use about 1 part of oxygen by volume to 3.3 parts of chlorin. Air does not work well since the great amount of nitrogen present (79 per cent) dilutes the reaction gases unduly and slows down the actions. On the other hand with pure oxygen there is apt to be too quick a development of heat and the production of undesirable localized zones of high temperature where fusion or sintering may take place. Fusion or sintering results in unattacked charge materials passing beyond the zone of reaction and my best results are obtained with oxygen in the presence of some nitrogen; but in considerably less proportion than that normal to air. Air contains about 21 per cent oxygen with 79 per cent of nitrogen and argon. I find that for the best results the amount of nitrogen present should, as stated, not be greater than the amount of oxygen; or in other words the ratio should not be higher than 50:50. On the other hand, a ratio of nitrogen to oxygen less than 20:80 is apt to result in the stated undesirable local fusion or sintering; and particularly with impure bauxites containing considerable proportions of silica and iron oxid; slag forming bodies. On the whole, a mixture of oxygen and nitrogen in the ratio of 40 parts nitrogen to 60 parts oxygen seems to work best with most bauxites and cokes, in the degrees of fineness best suited for the present operation. Advantageous ratios for the oxygen, chlorin and nitrogen are therefore about 20:67:13 parts by volume. Where oxygen is obtained from an air liquefying apparatus such a mixture may be made directly by taking some of the separated nitrogen and remixing it with the oxygen delivered so as to obtain the desired ratio. This nitrogen is absolutely dry and is therefore desirable for the present purposes. However, air can be used as a source of nitrogen, being advantageously dried by passage over sulfuric acid, refrigeration, or other well known ways. A mixture of equal parts of dry air and of oxygen will give the desired 40:60 ratio.

Because of the vigor and uniformity of action, it becomes practicable to use apparatus with cooled unattacked walls and yet attain high speed operation.

I have found that in passing such a mixture of somewhat diluted oxygen with chlorin upward through a shaft chamber of the general type of an ordinary shaft-and-shelf furnace complete reaction can be obtained with a mixture of hot coke and bauxite passing from shelf to shelf in a comparatively short length of travel. The action is so quick that the mixture may be entirely converted in a vertical travel of not more than 15 feet, using a temperature of 1600° to 2000° F. in the chamber. Ordinary oil coke is the best form of carbon to use since it contains practically no ash to be chlorinated. It should be heated to free it of hydrocarbons or volatile matter and introduced into the reaction zone at a temperature of usually not less than 1100° F. The bauxite must be free of moisture.

In the accompanying drawing I have shown more or less diagrammatically one form of apparatus useful in the performance of my process.

The illustration is a vertical section, partly in elevation, through a shaft-like reaction chamber, and through feeding means for solid materials and for gases.

Referring to the drawing, 1 indicates a vertical reaction chamber which may be of monolithic construction or which may be built up of firebrick or the like. Interiorly it is provided with staggered shelves 2 which as shown are provided with cooling flues or pipes 3. At the top of the shaft feed conduit 4 enters, this being advantageously lined with clay or the like at or near the point where it communicates with the reaction chamber. Material is supplied by screw conveyor 5 operated by shaft 6 and pulley 7. Hopper 8, in communication with the conduit is provided with bell 9 for feeding material to the conveyor, such bell being operated by handles 10. To prevent escape of gases and the like I ordinarily provide a double hopper arrangement, the top of hopper 8 being normally closed, as shown, by bell 11 operated by sleeve 12, passing through main hopper 13. The main hopper contains a mixture of ground bauxite and carbon and this mixture is fed from time to time to the supplementary hopper 8, the supply in the hopper 8 being maintained sufficient to permit continuous feed of the material past bell 9.

At the other side and at the top of the reaction chamber there is provided an offtake 14 leading to an aluminum chlorid condenser (not shown). At the bottom the reaction chamber is provided with a closure 15 having ash layer 16 to protect the metal parts. A gaseous draft current is admitted through pipe 16, oxygen and chlorin entering through inlet 17 and a diluent gas through valved inlet 18.

In a specific embodiment of my invention, a mixture of bauxite and petroleum coke ground to a fineness of 100 mesh is continuously fed by means of the hopper and conveyor mechanism as described to the reaction chamber 1. This tumbles down the shelves 2. This mixture is preliminarily heated to a temperature around 1100° F. for the purpose of driving off the moisture and volatiles from the coke and is admitted to the shaft 1 at that temperature, or above, so that the coke will ignite immediately upon coming in contact with the oxygen.

With a high speed operation under proper regulation of conditions including the amount of diluents supplied with the oxygen there is no escape of unconsumed chlorin at 14, and, on the other hand, no solid matter (with proper proportioning of coke and bauxite) reaches the bottom of the apparatus.

What I claim is:—

1. In the manufacture of anhydrous aluminum chlorid from coke and bauxite the process which comprises tumbling a hot mixture of fine ground coke and bauxite downward against an ascending current of a mixture of chlorin with oxygen diluted with nitrogen, the amount of nitrogen not being greater than the amount of oxygen.

2. In the manufacture of anhydrous aluminum chlorid from aluminous material and carbon the process which comprises tumbling a hot mixture of fine ground aluminous material and carbon downward against an ascending current of a mixture of chlorin with oxygen diluted with nitrogen, the proportion of nitrogen to oxygen being not less than 20:80 and not greater than 50:50.

3. In the manufacture of anhydrous aluminum chlorid from aluminous material and carbon the process which comprises tumbling a hot mixture of fine ground aluminous material and carbon downward against an ascending current of a mixture of chlorin, nitrogen and oxygen, said mixture containing nitrogen and oxygen in the approximate ratio of 40:60.

4. In the manufacture of aluminum chlorid, the process which comprises contacting at reactive temperatures and in counter-current flow a finely divided mixture of coke and bauxite with a mixture of gases comprising oxygen, chlorin and nitrogen, the volume ratio of the oxygen to the chlorin being about 1:3.3 while that of the oxygen to the nitrogen varies between 50:50 and 80:20.

5. In the manufacture of aluminum chlorid, the process which comprises contacting at reactive temperatures and in counter-current flow a finely divided mixture of coke and bauxite with a mixture of gases comprising oxygen, chlorin and nitrogen, the volume ratios of the said gases being approximately 20:67:13.

In testimony whereof, I have hereunto affixed my signature.

ALMER McDUFFIE McAFEE.